(12) United States Patent
Kinoshita et al.

(10) Patent No.: US 8,789,637 B1
(45) Date of Patent: Jul. 29, 2014

(54) BULLDOZER

(75) Inventors: Souichirou Kinoshita, Sao Paulo (BR); Akira Uno, Komatsu (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 13/883,294

(22) PCT Filed: Sep. 11, 2012

(86) PCT No.: PCT/JP2012/073215
§ 371 (c)(1),
(2), (4) Date: May 3, 2013

(87) PCT Pub. No.: WO2014/024325
PCT Pub. Date: Feb. 13, 2014

(30) Foreign Application Priority Data

Aug. 10, 2012 (JP) .................. 2012-177673

(51) Int. Cl.
*B62D 25/10* (2006.01)
*E02F 9/08* (2006.01)

(52) U.S. Cl.
CPC .................. *E02F 9/0891* (2013.01)
USPC ............ 180/69.24; 180/69.23; 180/69.2; 296/1.03; 296/193.11

(58) Field of Classification Search
USPC ........... 180/69.2, 69.22, 69.23, 69.24, 89.17; 296/1.03, 187.01, 203.01, 193.11; D15/31, 23–25, 33
See application file for complete search history.

(56) References Cited

U.S. PATENT DOCUMENTS

| | | | |
|---|---|---|---|
| 4,071,107 A * | 1/1978 | Leighty ..................... | 180/69.24 |
| 7,143,852 B2 * | 12/2006 | Yatsuda et al. .............. | 180/69.2 |
| 7,900,729 B2 * | 3/2011 | Smullen, Jr. ............... | 180/69.24 |
| 2005/0077062 A1 * | 4/2005 | Fukazawa et al. ........... | 172/776 |
| 2007/0056786 A1 * | 3/2007 | Fukazawa et al. ......... | 180/89.12 |
| 2007/0187163 A1 * | 8/2007 | Cone et al. .................. | 180/69.2 |
| 2011/0115259 A1 * | 5/2011 | Mizuta ..................... | 296/193.11 |

FOREIGN PATENT DOCUMENTS

| | | |
|---|---|---|
| JP | 52-16735 | 2/1977 |
| JP | 2005-113674 A | 4/2005 |
| JP | 2009-1139 A | 1/2009 |
| JP | 2012-136069 A | 7/2012 |

* cited by examiner

*Primary Examiner* — J. Allen Shriver, II
*Assistant Examiner* — Steve Clemmons
(74) *Attorney, Agent, or Firm* — Global IP Counselors, LLP

(57) ABSTRACT

A bulldozer includes a cab, a vehicle body frame supporting a cab and an engine cover. The engine cover has a side plate that has a rear edge with first and second rear edges. The second rear edge is positioned above the first rear edge. The side plate has a first planar portion which includes the first rear edge and a second planar portion which includes the second rear edge. The side plate has a bent shape between the first and second planar portions. A ridgeline is disposed between the first and second planar portions and spans from the upper edge to the rear edge of the side plate. The side plate includes an attachment section which is attached to a vehicle body frame. The attachment section is positioned in the first planar portion adjacent to an intersection of the ridgeline and the rear edge of the side plate.

11 Claims, 6 Drawing Sheets

BULLDOZER

CROSS-REFERENCE TO RELATED APPLICATIONS

This application claims priority to Japanese Patent Application No. 2012-177673 filed on Aug. 10, 2012, the disclosure of which is hereby incorporated herein by reference in its entirety.

BACKGROUND

1. Technical Field

The present invention relates to a bulldozer.

2. Background Information

A bulldozer is provided with an engine cover which is disposed in front of a cab. The engine cover has a side plate and the side plate is attached to a vehicle body frame. For example, in a bulldozer which is disclosed in Japanese Laid-open Patent Application No. 2005-113674, the engine cover is mounted onto the vehicle body frame. Since the bottom edge of the side plate is disposed close to the vehicle body frame in this type of bulldozer, it is normal for the side plate to be attached to the vehicle body frame in the vicinity of the bottom edge.

SUMMARY

The side plate is a portion in the engine cover where the area is comparatively large. As a result, it is easy for vibrations to be generated in the side plate. It is particularly easy for vibrations to be generated in the rear edge of the side plate when the side plate is attached to the vehicle body frame in the vicinity of the bottom edge as described above.

The object of the present invention is to provide a bulldozer where it is possible to suppress generation of vibrations at a side plate.

A bulldozer according to a first aspect of the present invention is provided with a vehicle body frame, a cab, and an engine cover. The cab is supported by the vehicle body frame. The engine cover is disposed in front of the cab. The engine cover has a side plate. The rear edge of the side plate has a first rear edge and a second rear edge which is positioned above the first rear edge. The side plate has a first planar portion which includes the first rear edge and a second planar portion which includes the second rear edge. The side plate has a shape which is bent between the first planar portion and the second planar portion. A ridgeline between the first planar portion and the second planar portion is disposed so as to span from the upper edge to the rear edge of the side plate. The side plate includes an attachment section which is attached to the vehicle body frame. The attachment section is positioned in the first planar portion in the vicinity of the intersection of the ridgeline and the rear edge of the side plate.

A bulldozer according to a second aspect of the present invention is the bulldozer according to the first aspect where the side plate has an opening communicated with an inner portion of the engine cover. The attachment section is positioned behind the opening.

A bulldozer according to a third aspect of the present invention is the bulldozer according to the first or second aspect where the center of gravity of the engine cover is positioned above the attachment section. The distance between the bottom edge of the side plate and the attachment section in the height direction is equal to or more than the distance between the attachment section and the center of gravity of the engine cover in the height direction.

A bulldozer according to a fourth aspect of the present invention is the bulldozer according to any of the first to third aspects where the vehicle body frame has a frame body and a frame side attachment section. The frame body supports the cab. The attachment section is attached to the frame side attachment section. The frame side attachment section is provided so as to protrude upward from the frame body.

A bulldozer according to a fifth aspect of the present invention is the bulldozer according to any of the first to fourth aspects where the attachment section is positioned at the same height as the intersection of the ridgeline and the rear edge of the side plate.

A bulldozer according to a sixth aspect of the present invention is the bulldozer according to any of the first to fifth aspects where the upper surface of the engine cover is inclined downward with a forward inclination.

A bulldozer according to a seventh aspect of the present invention is the bulldozer according to any of the first to sixth aspects where the rear edge of the side plate has a shape which is bent in a convex manner to the rear at the intersection of the first rear edge and the second rear edge.

In the bulldozer according to the first aspect of the present invention, the attachment section is positioned in the first planar portion in the vicinity of the intersection of the ridgeline and the rear edge of the side plate. As a result, it is possible to suppress generation of vibrations at the rear edge of the side plate compared to a case where the side plate is attached to the vehicle body frame at the bottom edge.

In the bulldozer according to the second aspect of the present invention, it is possible to suppress generation of vibrations at an edge portion of the opening.

In the bulldozer according to the third aspect of the present invention, it is possible to further suppress generation of vibrations in the side plate.

In the bulldozer according to the fourth aspect of the present invention, it is possible to dispose the attachment section in a high position with a simple configuration.

In the bulldozer according to the fifth aspect of the present invention, it is possible to further suppress generation of vibrations in the side plate.

In the bulldozer according to the sixth aspect of the present invention, the upper surface of the engine cover is inclined downward with a forward inclination. Since the rear edge of the side plate is longer than the front edge of the side plate in the engine cover with such a shape, it is easy for vibrations to be generated in the rear edge of the side plate. In the bulldozer according to the aspect, it is possible to effectively suppress such vibrations.

In the bulldozer according to the seventh aspect of the present invention, it is possible to further suppress vibrations by reducing the area of the side plate.

DETAILED DESCRIPTION OF THE EMBODIMENTS

Figure 1:
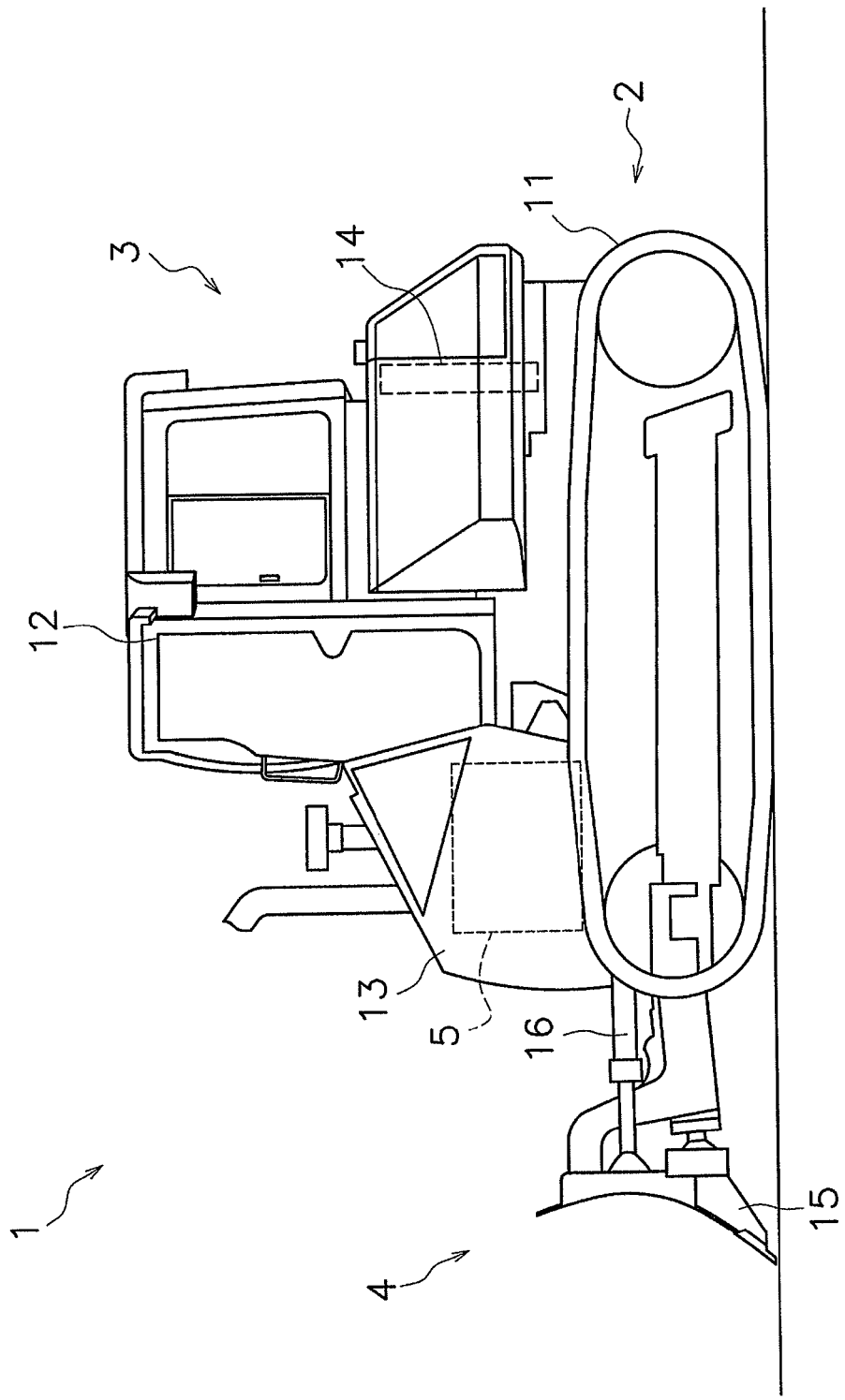
FIG. 1 is a side view of a bulldozer according to the first embodiment of the present invention.

A side view of a bulldozer 1 according to a first embodiment of the present invention is shown in FIG. 1. The bulldozer 1 is provided with a travel device 2, a vehicle body 3, and a work implement 4. The travel device 2 is a device for traveling the vehicle and has crawler tracks 11. The bulldozer 1 travels by the crawler tracks 11 being driven.

The vehicle body 3 includes a vehicle body frame 10 (refer to FIG. 6), a cab 12, an engine cover 13, and a cooling device 14. The cab 12 is supported by the vehicle body frame 10. The engine cover 13 is disposed in front of the cab 12. An engine 5 is installed in the engine cover 13. The upper surface of the engine cover 13 is inclined downward with a forward inclination. The cooling device 14 is disposed behind the cab 12. The cooling device 14 includes, for example, a radiator which cools cooling liquid in the engine 5 and an oil cooler which cools hydraulic fluid.

The work implement 4 is provided in front of the engine cover 13. The work implement 4 has a blade 15 and hydraulic cylinders 16. The blade 15 is provided swingably in upward and downward directions. The hydraulic cylinders 16 change the attitude of the blade 15.

Figure 2:
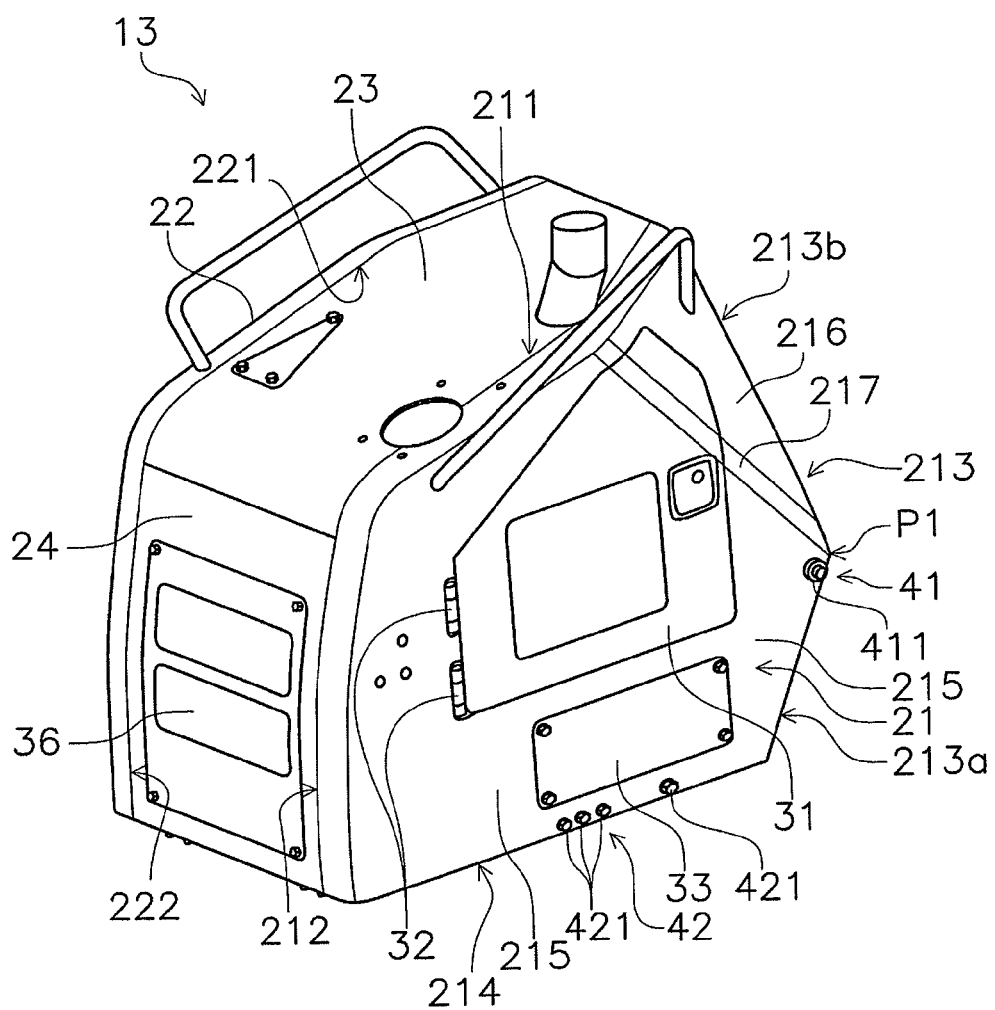
FIG. 2 is a perspective view of an engine cover of the bulldozer.
Figure 3:
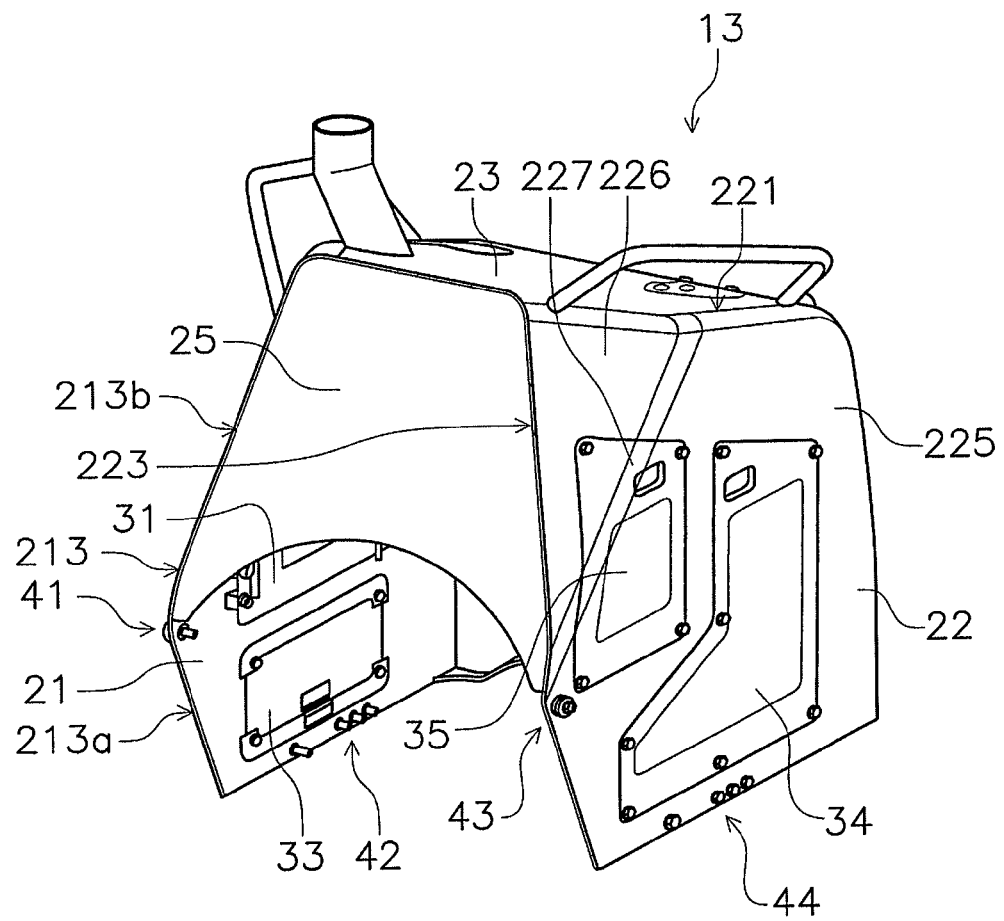
FIG. 3 is a perspective view of the engine cover.
Figure 4:
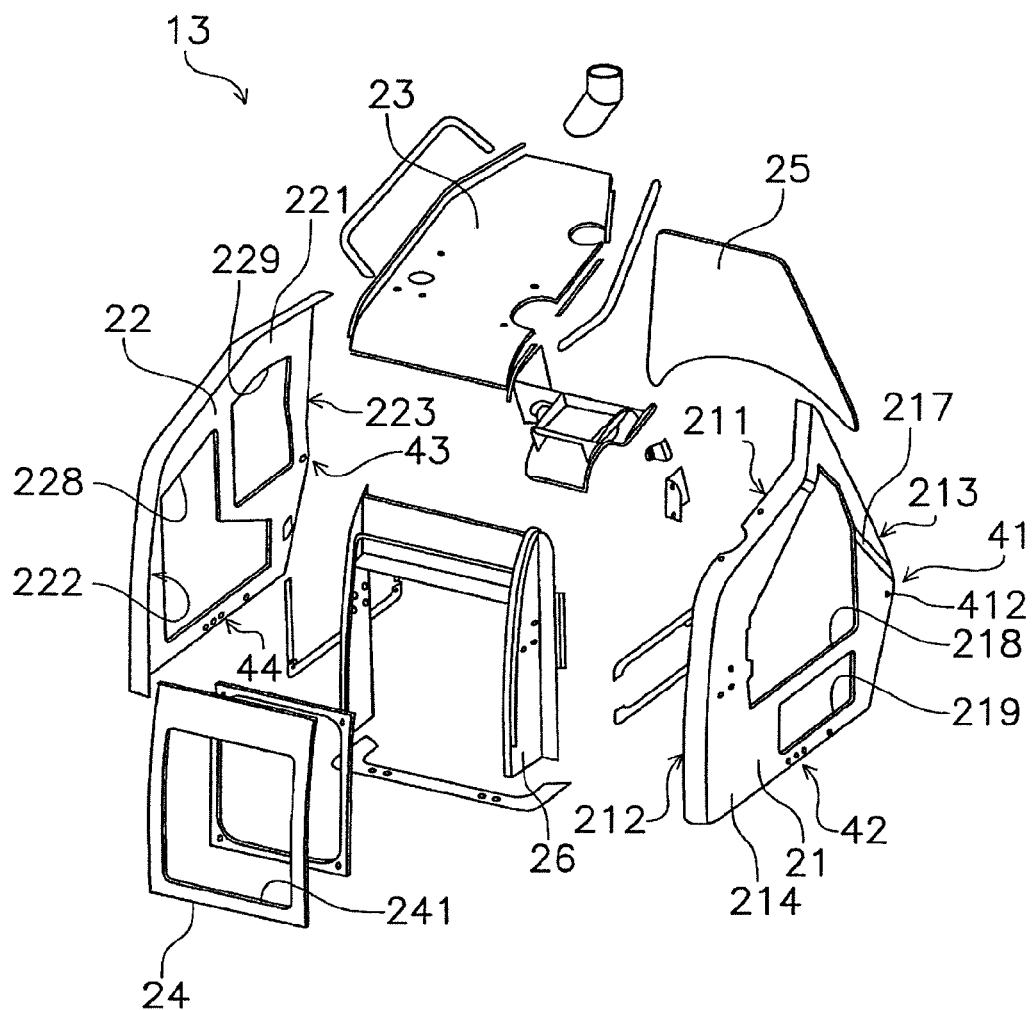
FIG. 4 is an exploded view of the engine cover.

FIG. 2 is a perspective view where the engine cover 13 is viewed from in front from a left diagonal. FIG. 3 is a perspective view where the engine cover 13 is viewed from the rear from a right diagonal. FIG. 4 is an exploded view of the engine cover 13.

The engine cover 13 has a left side plate 21, a right side plate 22, an upper surface plate 23, a front surface plate 24, a rear surface plate 25, and an inner frame 26. The left and right side plates 21 and 22 are disposed to be separated from each other in the vehicle width direction. The upper surface plate 23 is disposed across an upper edge 211 of the left side plate 21 and an upper edge 221 of the right side plate 22. The upper surface plate 23 is fixed to the left and right side plates 21 and 22 by, for example, a fixing means such as welding. The front surface plate 24 is disposed across a front edge 212 of the left side plate 21 and a front edge 222 of the right side plate 22. The front surface plate 24 is fixed to the left and right side plates 21 and 22 by, for example, a fixing means such as welding. The rear surface plate 25 is disposed across a rear edge 213 of the left side plate 21 and a rear edge 223 of the right side plate 22. The rear surface plate 25 is fixed to the left and right side plates 21 and 22 by, for example, a fixing means such as welding. The inner frame 26 is disposed between the left and right side plates 21 and 22. The inner frame 26 is disposed behind the front surface plate 24. The inner frame 26 is attached to the vehicle body frame 10.

Figure 5:
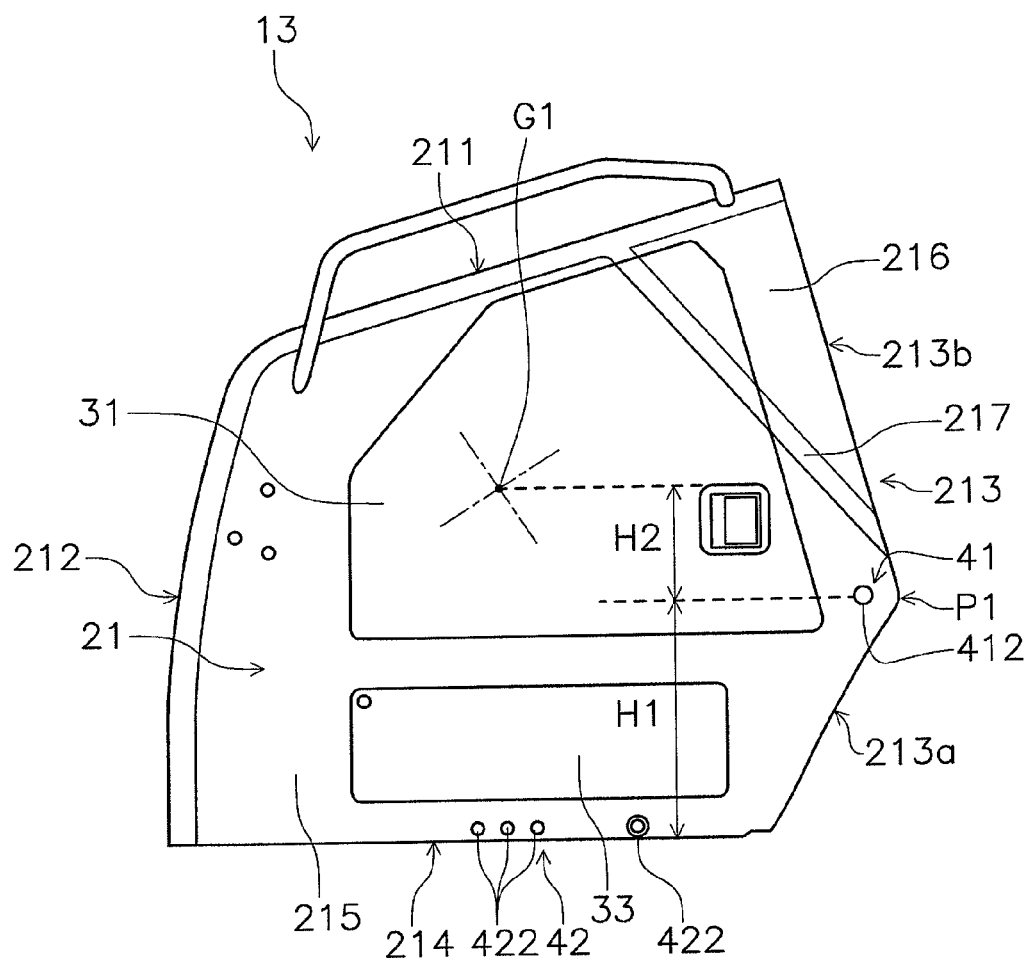
FIG. 5 is a left side surface view of the engine cover.

FIG. 5 is a left side view of the engine cover 13. As shown in FIG. 5, the rear edge 213 of the left side plate 21 has a first rear edge 213a and a second rear edge 213b. In a side view, the first rear edge 213a is inclined upward with a backward inclination. The second rear edge 213b is positioned above the first rear edge 213a. The second rear edge 213b is inclined downward with a backward inclination. The rear edge 213 of the left side plate 21 has a shape which is bent in a convex manner to the rear at an intersection P1 of the first rear edge 213a and the second rear edge 213b. The left side plate 21 has a first planar portion 215 and a second planar portion 216. The first planar portion 215 includes the first rear edge 213a. The second planar portion 216 includes the second rear edge 213b. In a side view, the first planar portion 215 has an area which is larger than the second planar portion 216. The first planar portion 215 includes the front edge 212 and a bottom edge 214 of the left side plate 21.

The left side plate 21 has a shape which is bent between the first planar portion 215 and the second planar portion 216. Due to this, it is possible to secure a wide view from inside of the cab 12. A ridgeline 217 between the first planar portion 215 and the second planar portion 216 is disposed to span from the upper edge 211 to the rear edge 213 of the left side plate 21.

The right side plate 22 has a shape which is roughly left and right symmetrical with the left side plate 21. As shown in FIG. 3, the right side plate 22 has a first planar portion 225 and a second planar portion 226. The first planar portion 225 of the right side plate 22 has a shape which is roughly left and right symmetrical with the first planar portion 215 of the left side plate 21. The second planar portion 226 of the right side plate 22 has a shape which is roughly left and right symmetrical with the second planar portion 216 of the left side plate 21. Accordingly, a detailed description of the right side plate 22 will be omitted.

As shown in FIG. 4, the left side plate 21 has a first left opening 218 and a second left opening 219. The first left opening 218 is disposed across the first planar portion 215 and the second planar portion 216 and intersects with the ridgeline 217. The second left opening 219 is provided in the first planar portion 215. The second left opening 219 is positioned below the first left opening 218.

As shown in FIG. 2, the engine cover 13 has a left inspection door 31. The left inspection door 31 covers the first left opening 218. The left inspection door 31 is attached to the left side plate 21 via a hinge 32. The first left opening 218 is opened and closed by the left inspection door 31 rotating centered on the hinge 32. The engine cover 13 has a left inspection cover 33. The left inspection cover 33 covers the second left opening 219. The left inspection cover 33 is attached to the left side plate 21 using bolts so as to be able to be attached and detached.

As shown in FIG. 4, the right side plate 22 has a first right opening 228 and a second right opening 229. The first right opening 228 is provided in the first planar portion 225. The second right opening 229 is disposed across the first planar portion 225 and the second planar portion 226 and intersects with a ridgeline 227. The second right opening 229 is positioned behind the first right opening 228.

As shown in FIG. 3, the engine cover 13 has a first right inspection cover 34 and a second right inspection cover 35. The first right inspection cover 34 covers the first right opening 228. The first right inspection cover 34 is attached to the right side plate 22 using bolts so as to be able to be attached and detached. The second right inspection cover 35 covers the second right opening 229. The second right inspection cover 35 is attached to the right side plate 22 using bolts so as to be able to be attached and detached.

As shown in FIG. 4, the front surface plate 24 has a front opening 241. As shown in FIG. 2, the engine cover 13 has a front inspection cover 36. The front inspection cover 36 covers the front opening 241. The front inspection cover 36 is attached to the front surface plate 24 using bolts so as to be able to be attached and detached.

As shown in FIG. 2, the left side plate 21 has a first left attachment section 41 and a second left attachment section 42. The first left attachment section 41 and the second left attachment section 42 are attached to the vehicle body frame 10. The first left attachment section 41 has a bolt 411 shown in FIG. 2 and a hole 412 shown in FIG. 4 where the bolt 411 is inserted. As shown in FIG. 5, the first left attachment section 41 is positioned in the first planar portion 215 in the vicinity of the intersection P1 of the ridgeline 217 and the rear edge 213 of the left side plate 21. The first left attachment section 41 is positioned behind the first left opening 218. The first left attachment section 41 is positioned at the same height as the intersection P1 of the ridgeline 217 of the left side plate 21 and the rear edge 213 of the left side plate 21.

As shown in FIG. 5, a center of gravity G1 of the engine cover 13 is positioned above the first left attachment section 41. A distance H1 between the bottom edge 214 of the left side plate 21 and the first left attachment section 41 in the height direction is equal to or more than a distance H2 between the first left attachment section 41 and the center of gravity G1 of the engine cover 13 in the height direction.

The second left attachment section 42 is positioned below the second left opening 219. The second left attachment section 42 is positioned in front of and below the first left attachment section 41. The second left attachment section 42 has a plurality of bolts 421 shown in FIG. 2 and a plurality of holes 422 shown in FIG. 4 where the bolts 421 are inserted. The holes 422 in the second left attachment section 42 are disposed along the bottom edge 214 of the left side plate 21.

As shown in FIG. 3, the right side plate 22 has a first right attachment section 43 and a second right attachment section 44. The first right attachment section 43 and the second right attachment section 44 are attached to the vehicle body frame 10. The first right attachment section 43 is disposed to be roughly left and right symmetrical to the first left attachment section 41. The second right attachment section 44 is disposed to be roughly left and right symmetrical to the second left attachment section 42. Accordingly, a detailed description of the first right attachment section 43 and the second right attachment section 44 will be omitted.

Figure 6:
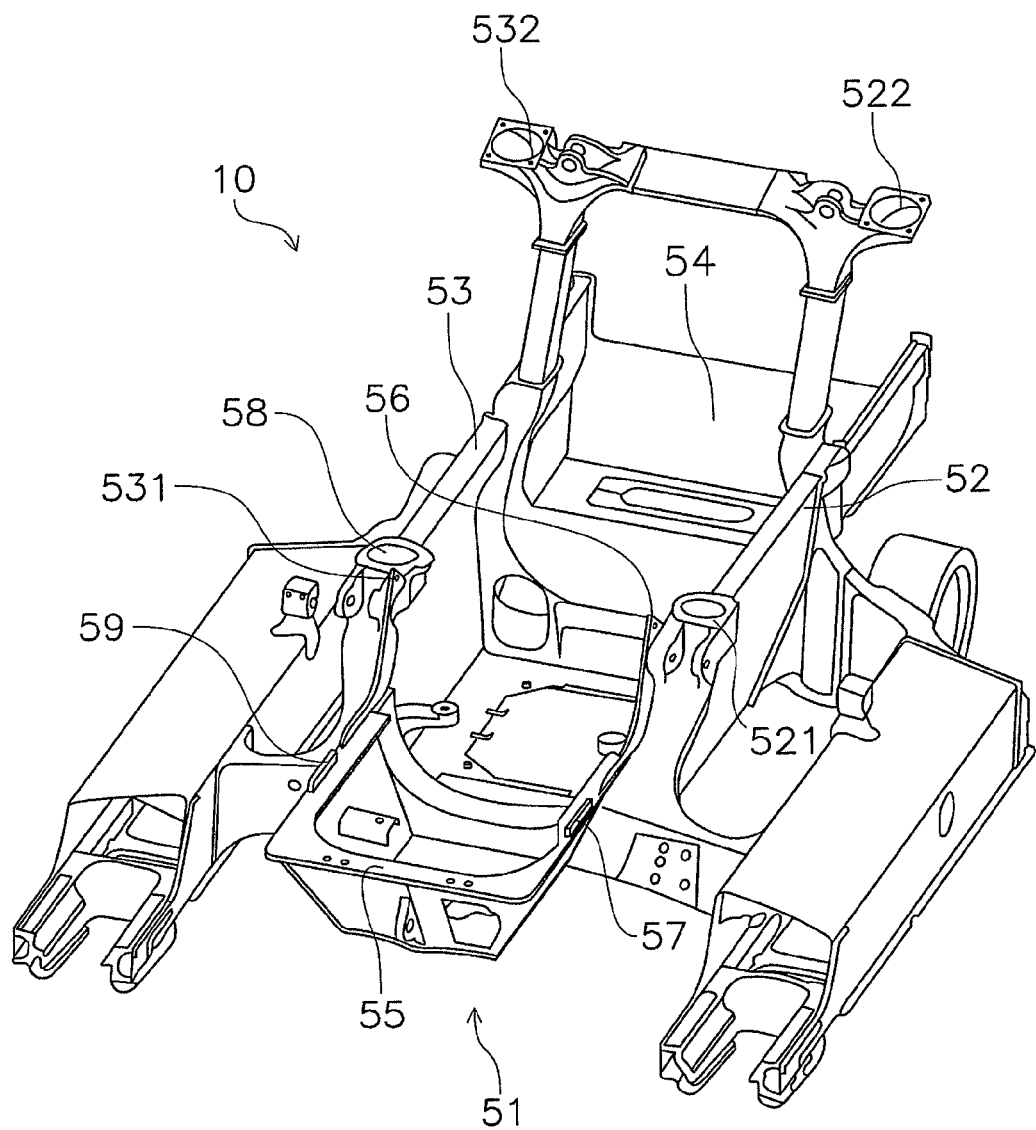
FIG. 6 is a perspective view of a vehicle body frame.

FIG. 6 is a perspective view of the vehicle body frame 10. The vehicle body frame 10 has a frame body 51. The frame body 51 has a left side frame 52, a right side frame 53, a bottom frame 54, and a front frame 55. Each of the left side frame 52 and the right side frame 53 extend in the forward and backward direction of the vehicle and are disposed to be separated from each other in the vehicle width direction. The bottom frame 54 connects the left side frame 52 and the right side frame 53. The front frame 55 is disposed in front of the left side frame 52 and the right side frame 53. The front frame 55 supports the engine 5. The inner frame 26 of the engine cover 13 is attached to the front frame 55.

The frame body 51 has a left front cab mounting section 521, a right front cab mounting section 531, a left rear cab mounting section 522, and a right rear cab mounting section 532. The left front cab mounting section 521 and the left rear cab mounting section 522 are attached to the left side frame 52. The right front cab mounting section 531 and the right rear cab mounting section 532 are attached to the right side frame 53. The left and right front cab mounting sections 521 and 531 and the left and right rear cab mounting sections 522 and 532 support the cab 12 via a mounting device which is not shown.

The vehicle body frame 10 has a first left frame side attachment section 56, a second left frame side attachment section 57, a first right frame side attachment section 58, and a second right frame side attachment section 59. Each of the first left frame side attachment section 56, the second left frame side attachment section 57, the first right frame side attachment section 58, and the second right frame side attachment section 59 are provided to protrude upward from the frame body 51. The first left attachment section 41 is attached in the first left frame side attachment section 56. The second left attachment section 42 is attached in the second left frame side attachment section 57. The first right attachment section 43 is attached in the first right frame side attachment section 58. The second right attachment section 44 is attached in the second right frame side attachment section 59.

The first left frame side attachment section 56 has a shape similar to a plate. The first left frame side attachment section 56 is disposed so as to protrude upward from the left side frame 52. A hole which screws together with the bolt 411 of the first left attachment section 41 is provided in the first left frame side attachment section 56. The second left frame side attachment section 57 has a shape similar to a plate. The second left frame side attachment section 57 is disposed so as to protrude upward from the front frame 55. A hole which screws together with the bolt 421 of the second left attachment section 42 is provided in the second left frame side attachment section 57. The first right frame side attachment section 58 has a shape which is roughly left and right symmetrical to the first left frame side attachment section 56. The second right frame side attachment section 59 has a shape which is roughly left and right symmetrical to the second left frame side attachment section 57. Accordingly, a detailed description of the first right frame side attachment section 58 and the second right frame side attachment section 59 will be omitted.

In the bulldozer according to the present embodiment, the first left attachment section 41 is positioned in the first planar portion 215 in the vicinity of the intersection P1 of the ridgeline 217 and the rear edge of the side plate. As a result, the length of a portion of the rear edge 213 of the left side plate 21 which is not attached to the vehicle body frame 10 is shorter compared to a case where the first left attachment section 41 is disposed in the vicinity of the bottom edge 214 of the left side plate 21. Due to this, it is possible to suppress generation of vibrations in the left side plate 21.

The first left attachment section 41 is disposed behind the first left opening 218. As a result, it is possible to suppress generation of vibrations at the edge of the first left opening 218.

The distance H1 between the bottom edge 214 of the left side plate 21 and the first left attachment section 41 in the height direction is equal to or more than the distance H2 between the first left attachment section 41 and the center of gravity G1 of the engine cover 13 in the height direction. As a result, it is possible to further suppress generation of vibrations in the left side plate 21.

The first left frame side attachment section 56 is provided so as to protrude upward from the frame body 51. As a result, it is possible to dispose the first left attachment section 41 in a high position with a simple configuration compared to a case where the frame body 51 itself is expanded upward.

The first left attachment section 41 is positioned at the same height as the intersection P1 of the ridgeline 217 of the left side plate 21 and the rear edge 213 of the left side plate 21. As a result, it is possible to further suppress generation of vibrations in the left side plate 21.

The upper surface of the engine cover 13 is inclined downward with a forward inclination. Since the rear edge 213 of the left side plate 21 is longer than the front edge 212 of the left side plate 21 in the engine cover 13 with such a shape, it is easy for vibrations to be generated in the rear edge 213 of the left side plate 21. In the bulldozer according to the embodiment, it is possible to effectively suppress generation of such vibrations.

Above, the effect of suppressing vibrations in the left side plate 21 using the first left attachment section 41 has been described, but in the same manner, it is possible to obtain the effect of suppressing vibrations in the right side plate 22 using the first right attachment section 43.

Above, an embodiment of the present invention has been described, but the present invention is not limited to the embodiment described above and various modifications are possible in a scope which does not depart from the scope of the invention.

In the embodiment described above, the attachment section is configured using the bolt and the hole. However, it is sufficient if the attachment section is a configuration which is different to the embodiment described above as long as it is a configuration for attaching the side plate to the vehicle body frame 10.

In the embodiment described above, the configuration of the side plate of the present invention is applicable to both the left and right side plates 21 and 22. However, it is sufficient if the configuration of the side plate of the present invention is applied to either the left or the right side plate 21 and 22.

According to the present invention, it is possible to provide a bulldozer where it is possible to suppress generation of vibrations in a side plate.

The invention claimed is:

1. A bulldozer comprising:
   a vehicle body frame;
   a cab supported by the vehicle body frame; and
   an engine cover disposed in front of the cab, the engine cover including a side plate that has a rear edge, a first planar portion, a second planar portion and an attachment section,
   the first planar portion including a first rear edge of the side plate, the second planar portion including a second rear edge of the side plate, the second rear edge being positioned above the first rear edge,
   the side plate having a bent shape between the first planar portion and the second planar portion,
   a ridgeline being disposed between the first planar portion and the second planar portion and spanning from an upper edge of the side plate to the rear edge of the side plate,
   the attachment section being attached to the vehicle body frame, and
   the attachment section being positioned in the first planar portion adjacent to an intersection of the ridgeline and the rear edge of the side plate.

2. The bulldozer according to claim 1, wherein
   the side plate has an opening that communicates with an inner portion of the engine cover, and
   the attachment section is positioned behind the opening.

3. The bulldozer according to claim 1, wherein
   a center of gravity of the engine cover is positioned above the attachment section, and
   a distance between bottom edge of the side plate and the attachment section in a height direction of the bulldozer is equal to or more than a distance between the attachment section and the center of gravity of the engine cover in the height direction.

4. The bulldozer according to claim 1, wherein
   the vehicle body frame has a frame body supporting the cab and a frame side attachment section to which the attachment section is attached, and
   the frame side attachment section protrudes upward from the frame body.

5. The bulldozer according to claim 1, wherein
   the attachment section is positioned at the same height as the intersection of the ridgeline and the rear edge of the side plate.

6. The bulldozer according to claim 1, wherein
   the upper surface of the engine cover is inclined downward with a forward inclination.

7. The bulldozer according to claim 1, wherein
   the rear edge of the side plate has a convex shape protruding to the rear at the intersection of the first rear edge and the second rear edge.

8. The bulldozer according to claim 2, wherein
   the upper surface of the engine cover is inclined downward with a forward inclination.

9. The bulldozer according to claim 3, wherein
   the upper surface of the engine cover is inclined downward with a forward inclination.

10. The bulldozer according to claim 4, wherein
    the upper surface of the engine cover is inclined downward with a forward inclination.

11. The bulldozer according to claim 5, wherein
    the upper surface of the engine cover is inclined downward with a forward inclination.

* * * * *